May 7, 1935. E. L. WIEGAND Re. 19,567

METHOD OF FORMING ELECTRICAL HEATING ELEMENTS

Original Filed Dec. 31, 1923

EDWIN L. WIEGAND
INVENTOR
BY Freeman and Weidman
ATTORNEYS

Reissued May 7, 1935

Re. 19,567

UNITED STATES PATENT OFFICE 19,567

METHOD OF FORMING ELECTRICAL HEATING ELEMENTS

Edwin L. Wiegand, Pittsburgh, Pa.

Original No. 1,903,604, dated April 11, 1933, Serial No. 329,630, December 31, 1928. Application for reissue May 12, 1934, Serial No. 725,392

13 Claims. (Cl. 201—67)

This invention relates generally to the method of forming electrical heating units and in some respects is in the nature of an improvement upon the methods and processes described in my Patent No. 1,613,426 and the class of heating units described in my Patent No. 1,614,331.

The object of the invention is to provide a novel method which can be utilized for the economical fabrication of heating units of various types.

The invention consists in the various steps hereinafter fully described and set forth in the appended claims.

Figure 1:
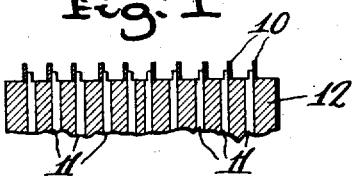
Figure 2:
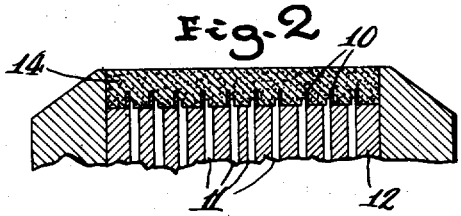
Figure 3:
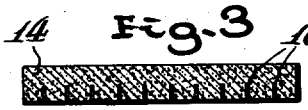
Figure 7:
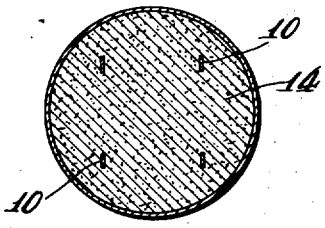
Figure 4:
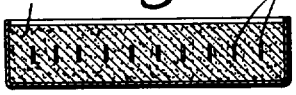
Figure 8:
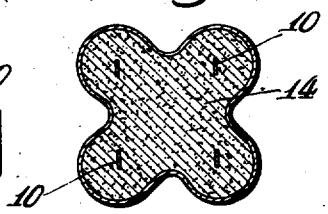
Figure 5:
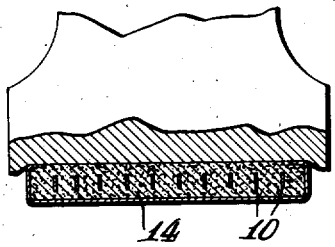
Figure 6:
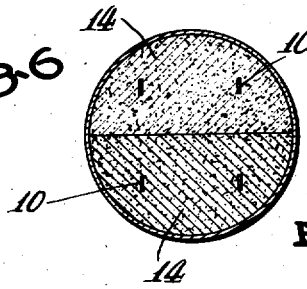

In the drawing forming part of this specification, Fig. 1 is a view illustrating a resistor positioned upon a suitable support; Fig. 2 is a similar view showing the resistor positioned upon the support and enveloped in a mass of refractory material; Fig. 3 is a view showing the resistor and refractory material removed from the support; Fig. 4 is a view showing said resistor and enveloping refractory material arranged in a metallic sheath or casing; Fig. 5 is a view showing such sheath or casing with the refractory material and resistor arranged therein and subjected to pressure and Figs. 6, 7 and 8 show other forms of metal sheaths or casings, with the refractory material and resistor arranged therein, before and after pressure has been applied to complete the units.

Heretofore, in making electrical heating units, one process or method has consisted in arranging a definite quantity of refractory insulating material in a definite shape and then inserting or positioning a resistor within said refractory mass, then applying pressure either with or without adding additional refractory material, permitting the refractory mass to dry, applying a cover plate and then applying the final compression and shaping pressures to produce the ultimate product.

In the present method, the resistor 10 is of the relatively delicate wire ordinarily employed in heating elements of the type herein contemplated, relatively unstable in the artificial winding formations ordinarily adapted for obtaining maximum heating efficiency, adapted to be positioned upon a suitable support comprising a plurality of pins 11 arranged to hold the resistor in such winding formation, substantially similar to that disclosed in my said Patent 1,614,331, the pins projecting from a base block 12, which is of the desired size and shape according to the unit to be produced, and this block from which the positioning means project is preferably surrounded by a wall or border of the shape corresponding with the shape of the block, which wall or border may be in one piece or a number of pieces as desired and is for the purpose of retaining the refractory mass against lateral spread.

After the resistor 10 has been properly positioned upon the supporting pins 11 and the wall arranged in place, I loosely deposit a mass of refractory insulating material 14 within the wall, and between and about the convolutions of the resistor, and the mass then compacted about said resistor to the desired extent while backed by the insulating material, thereby preventing injury to said resistor, and simultaneously effecting imprisonment of the resistor in the desired formation within the mass of insulating material. This pressure can be applied in any suitable manner such as a plunger operated in any suitable manner.

The compacted mass with the resistor embedded therein, is then placed as a unit, in a sheath or casing. This placement of the compacted refractory mass with the resistor embedded therein can be accomplished either by removing the compacted mass and resistor therein from the form and inserting the same in a suitable sheath or casing, or the sheath or casing can be placed over the compacted mass with the resistor therein before said mass and resistor is removed from the support.

It will therefore be understood that it is immaterial whether the compacted mass with resistor therein is removed from the support either before or after the sheath or casing is applied thereto.

After the sheath or casing has been applied to the compacted mass with resistor therein, an additional quantity of refractory material may be inserted and additional pressure applied thereto, or pressure can be applied without the additional mass of refractory material, this being governed entirely by the nature of the heating unit to be produced, and also by the shape thereof.

In some instances, owing to the nature of the refractory and the binder employed in connection therewith, it may be advisable to have a preliminary drying before the ultimate pressure is applied to the article, whereas, in other instances, such preliminary drying may not be necessary due to the fact that the binder is of such a nature that the heating or baking will thoroughly accomplish the proper drying of the compacted mass for the purpose of producing a homogeneous article.

In Fig. 4, I have shown a mass of refractory material removed from the positioning form and placed in a substantially flat shallow sheath or casing to which additional pressure may or may not be applied, and to which additional refractory material may or may not be applied, it depending entirely upon whether or not the resistor is to be completely enveloped by the refractory material, it being understood that such complete envelopment is a preferable and desirable condition in most cases.

After the proper amount of refractory material with the resistor embedded therein has been placed within the sheath or casing, the ultimate pressure can be applied thereto, and the edges of the sheath or casing can be turned inwardly over the adjacent portions of the refractory for the purpose of completing the article which may then be given the final baking and, if desired, the refractory material may be given a glaze coating and fired.

In Fig. 6, I have shown a mass of refractory material with the resistor embedded therein inserted in a sheath or casing which is in the nature of a cartridge and the ultimate pressure of the refractory material can be had at the same time that the ultimate shaping pressure is applied to the sheath or casing, the pressing operation effecting a compacting and condensing of the mass, preserving at all times the proper envelopment of the resistor.

Whether or not the refractory mass is or is not given a preliminary drying in this particular process will, of course, depend upon whether or not the binder used in connection with such mass is or is not of such a nature as to require such preliminary drying. If it be of such nature, the preliminary drying will of course be had and, if not, the drying can take place at the same time that the ultimate baking occurs.

It will therefore be understood that the fundamental principle of this process or method can be utilized in various forms or shapes of electrical heating units, so long as the broad principle is carried out, said broad principle being the positioning of the resistor, enveloping said resistor by a mass of refractory material and then placing said mass with resistor therein in a metal sheath or casing.

Having thus described my invention, what I claim is:

1. The method of making resistor heating elements of the character described, in which the resistor is in the form of a thin ribbon of considerable width with respect to its thickness, which comprises holding the resistor against displacement, and pouring insulating material over and about the resistor, then mechanically compacting the insulating material about the resistor until the same is enveloped, then enclosing the mass with resistor therein within a sheath.

2. The method of making resistor heating elements of the character described, in which the resistor is in the form of a thin ribbon of considerable width with respect to its thickness, which comprises holding the resistor against displacement, pouring insulating material over and about the resistor, mechanically compacting the insulating material about the resistor under pressure, then enclosing the mass thus obtained within a sheath and further compressing the same.

3. The method of making resistor heating elements of the character described, in which the resistor is in the form of a thin ribbon of considerable width with respect to its thickness, which comprises holding the resistor against displacement, covering the resistor with insulating material, and then mechanically compacting the insulating material about the resistor, then adding more insulating material, and further compacting the same under relatively high pressure.

4. The method of making resistor heating elements of the character described, in which the resistor is in the form of a relatively delicate resistance wire, which comprises holding the resistor against displacement, pouring refractory insulating material loosely over and about the resistor, mechanically compacting the loose insulating material to fix the same about the resistor wire, and then supplying the fixed compacted mass with a sheath member.

5. The method of making resistor heating elements of the character described, in which the resistor is in the form of a relatively delicate resistance wire, which comprises holding the resistor against displacement, pouring refractory insulating material loosely over and about the resistor, mechanically compacting the loose insulating material to fix the same about the resistor wire, supplying the fixed compacted mass enveloping the resistor wire with a sheath member, and additionally compacting said mass while positioned within said sheath member.

6. The method of making resistor heating elements of the character described, in which the resistor is in the form of a relatively delicate resistance wire, which comprises holding the resistor against displacement, pouring refractory insulating material loosely over and about the resistor, mechanically compacting the loose insulating material to fix the same about the resistor wire, supplying the fixed compacted mass enveloping the resistor wire with a sheath member, and additionally compacting said mass while positioned within said sheath member through compression of said sheath member about said mass.

7. The method of making resistor heating elements of the character described, in which the resistor is in the form of a relatively delicate resistance wire, which comprises holding the resistor against displacement within a mold, pouring loose mechanically compactable refractory insulating material into said mold and over and about the resistor, mechanically compacting the insulating material while in said mold to fix the same about the resistor, removing said mold to free said compacted mass, and supplying the compacted mass with a sheath member.

8. The method of making resistor heating elements of the character described, in which the resistor is in the form of a relatively delicate resistance wire, which comprises holding the resistor against displacement, pouring refractory insulating material loosely over and about the resistor, and mechanically compacting the loose insulating material to fix the same about the resistor wire.

9. The method of making resistor heating elements of the character described, in which the resistor is in the form of a relatively delicate resistance wire, which comprises holding the resistor against displacement within a mold, pouring loose mechanically compactable refractory insulating material into said mold and over and about the resistor, mechanically compacting the insulating material while in said mold to fix the same about the resistor, and removing said mold to free said compacted mass.

10. The method of making resistor heating elements of the character described, in which the resistor is in the form of a relatively delicate resistance wire, which comprises holding the resistor against displacement, pouring refractory insulating material loosely over and about the resistor, mechanically compacting the loose insulating material to fix the same about the resistor wire, adding more insulating material, and compacting the additional insulating material.

11. The method of making resistor heating elements of the character described, in which the resistor is in the form of a relatively delicate resistance wire, which comprises holding the resistor against displacement within a mold, pouring loose mechanically compactable refractory insulating material into said mold and over and about the resistor, mechanically compacting the insulating material while in said mold to fix the same about the resistor, removing said mold to free said compacted mass, adding more insulating material to further envelop said resistor, and compacting the additional insulating material.

12. The method of making resistor heating elements of the character described, in which the resistor is in the form of a relatively delicate resistance wire, which comprises holding the resistor against displacement, pouring refractory insulating material loosely over and about the resistor, mechanically compacting the loose insulating material to fix the same about the resistor wire, supplying the fixed compacted mass with a sheath member, adding more insulating material, and compacting the additional insulating material.

13. The method of making resistor heating elements of the character described, in which the resistor is in the form of a relatively delicate resistance wire, which comprises holding the resistor against displacement within a mold, pouring loose mechanically compactable refractory insulating material into said mold and over and about the resistor, mechanically compacting the insulating material while in said mold to fix the same about the resistor, removing said mold to free said compacted mass, supplying the compacted mass with a sheath member, adding more insulating material, and compacting the additional insulating material.

EDWIN L. WIEGAND.